C. A. SHEA.
ELECTRIC MOTOR.
APPLICATION FILED MAY 24, 1915.
1,216,002.
Patented Feb. 13, 1917.
2 SHEETS—SHEET 1.
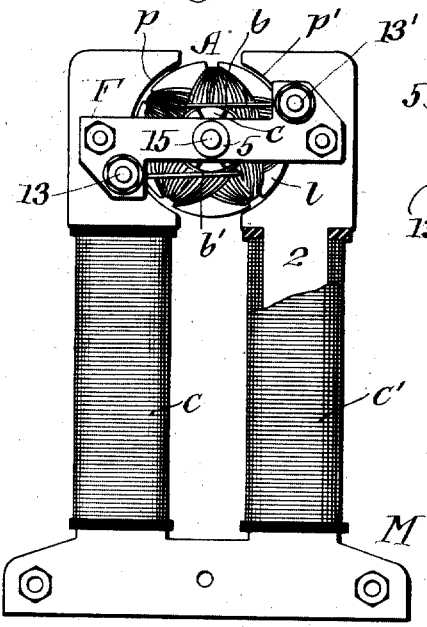
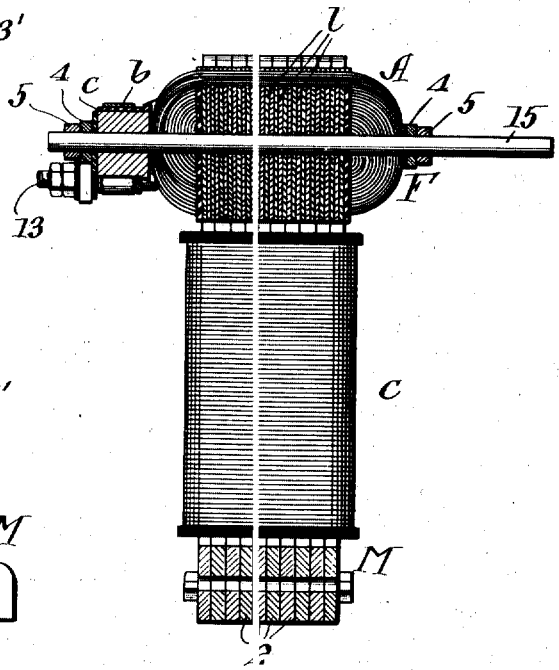
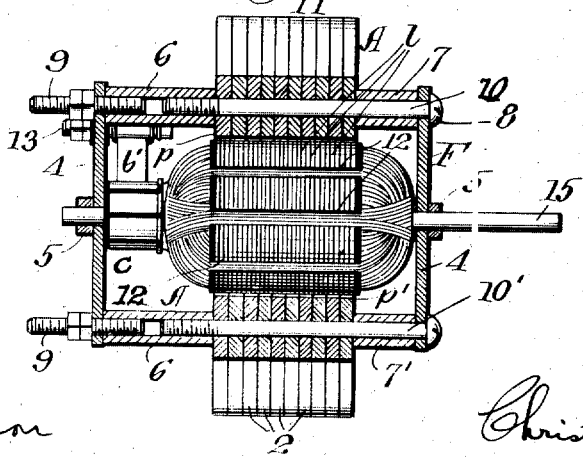
WITNESSES
INVENTOR
Christopher A. Shea

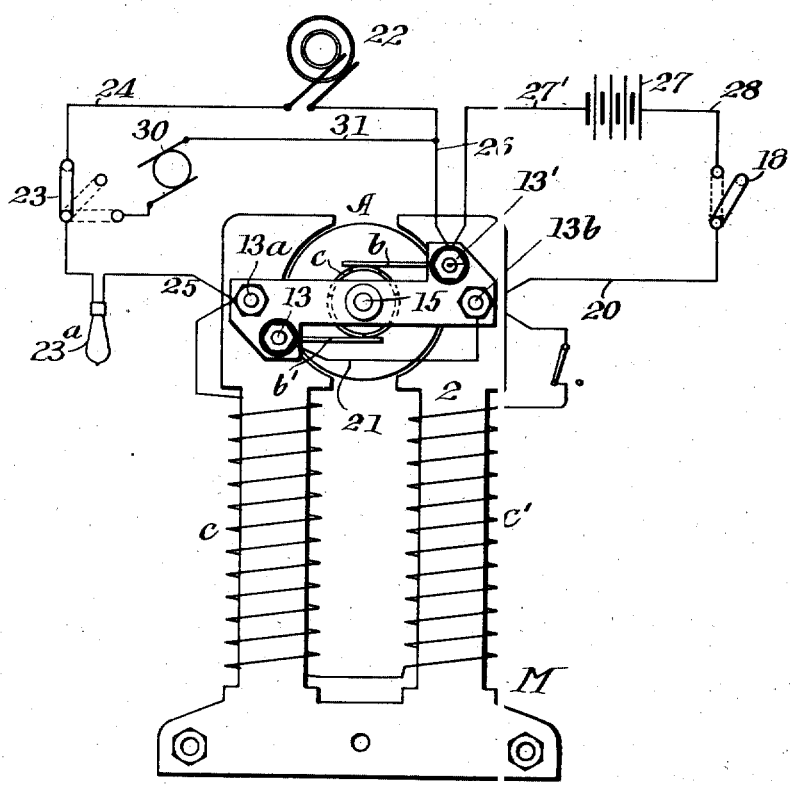

UNITED STATES PATENT OFFICE.

CHRISTOPHER A. SHEA, OF BOSTON, MASSACHUSETTS.

ELECTRIC MOTOR.

1,216,002.   Specification of Letters Patent.   Patented Feb. 13, 1917.

Application filed May 24, 1915. Serial No. 30,079.

*To all whom it may concern:*

Be it known that I, CHRISTOPHER A. SHEA, a citizen of the United States, residing at Boston, in the county of Suffolk and State of Massachusetts, have invented new and useful Improvements in Electric Motors, of which the following is a specification.

My invention relates to electric motors, and its object is to provide a machine of this type, for utilizing the lines of force of a magnetic field to impart mechanical motion to an armature, adapted to be energized either by current from dry cells or storage batteries or by a high voltage direct or alternating current, and capable of developing high efficiency with low current consumption.

This motor has developed in actual use a very high efficiency, far beyond that of any electric motor in general use or with which I am familiar.

Other features of my invention not hereinbefore referred to will be hereafter described and claimed and are illustrated in the accompanying drawing, in which Figure 1 is an elevation of my invention illustrating its adaptability to various sources and kinds of electric energy, including alternating current. Fig. 2 is a central vertical section of the same machine. Fig. 3 is a horizontal section of the same taken through the armature shaft. Fig. 4 is a diagrammatic view showing the various circuits in connection with my motor.

Similar characters designate like parts in all the figures of the drawing.

Referring first to the apparatus shown in Figs. 1 to 3 inclusive, the principal elements of my machine are a compound permanent and electro magnet and a rotary element or armature, preferably having a plurality of coils, and to which rotary motion is imparted by the electromagnetic reaction. I prefer to employ a magnet composed of a plurality of thin sheets of steel, thus obtaining with such a compound structure as strong a field as possible. This magnet may be of the type designated by M formed of a multiplicity of thin sheets of steel, each of which is indicated generally by 2, and wound with the coils $c$ and $c'$ which may be included within the armature circuit in the manner hereinafter described and shown in Fig. 4, when it is desired to utilize the magnet as an electromagnet, as for example when a high voltage direct or alternating current is employed to energize the motor, or for the purpose of automatically recharging the magnet by means of a direct current when the flux is gone. The individual sheets composing the compound structure M may be secured together in any suitable manner, preferably by means of a frame so constructed as to be capable of supporting for rotation the armature of the machine. A frame suitable for the purpose is indicated at F. In the particular construction shown it comprises a pair of long end pieces, 4, having bearings, such as 5, for the armature shaft and side elements for spacing the end pieces 4 at the proper distance apart and connecting them while at the same time serving to tie together the individual sheets 2 of the compound magnet M. In the construction shown there are two long sleeves, 6, (Fig. 3) bored and tapped throughout their length and two short spacing pieces, 7, somewhat similar to the sleeves themselves, bored and tapped at their outer ends to receive suitable fastening screws, such as 8, corresponding to screws 9 for securing together the sleeve 6 and the end piece 4 adjacent to them. At their inner ends these filling pieces 7 are extended to form long screw rods, such as 10, threaded at their extreme inner ends to enter the threaded bores of the sleeves 6 and having preferably smooth shanks where they pass through the individual laminations 2 to hold them together. All these individual laminations 2 it should be noted are alike, that is preferably interchangeable, and have registering openings at suitable points for purposes of connection and attachment to other parts.

The individual laminations 2 are preferably formed with curved polar faces, which preferably coincide with opposite arcs of the same imaginary circle. Each face as shown occupies an arc of considerably more than 120°, and the space between these polar faces is intended to be substantially filled by a suitable rotary armature provided with plurality coils to which armature rotary movement will be imparted by the action of the magnetic field when current is conducted through the coils of the armature.

An armature suitable for carrying my present invention into effect is shown at A. It is intended to substantially fill the space between the curved polar faces $p$ and $p'$ of the permanent or electro magnet M and leave but a small air gap between said polar faces and the adjacent surface of the armature. This armature is shown as of cylindrical type, being in this instance laminated and comprising a large number of disks or laminæ 1 peripherally notched longitudinally, as shown at 12, to receive the turns of the armature coils. In the particular construction illustrated the armature has a multiplicity of coils, which are wound into the notches 12, and the ends of these coils are brought out and connected to segments of a suitable commutator, such as C, in a manner analogous to that employed in dynamo-electric machines. A pair of brushes, such as $b$ and $b'$, coöperate with the segments of the commutator in the construction illustrated and are connected to insulated binding posts 13 and 13' in any suitable manner. The permanent, or electro magnet and the armature, as will be obvious by reference to these views, are so formed and combined as to produce an unusually high efficiency, the air gap being small and there being a relatively large number of conductors cutting the lines of force of the field at any given moment, and the intensity of the field being substantially the maximum attainable in a machine of this type and for a given size, while the amount of current required to energize the armature coils, as they come into action one after another, is low.

Of course it will be understood that the rotation of the armature shaft, indicated at 15, may be transmitted to any suitable part or apparatus to be driven, and that the coils of the armature and fields may be energized from any source of electric current by the various methods now to be described in detail.

In Fig. 4, 22 indicates a source of high voltage alternating current. The connections between this alternating current source and my improved machine are shown as such that when switch 23 is closed, the current will traverse the following path: from the generator 22 through conductor 24, switch 23, and lamp 23ª which acts as a resistance, conductor 25, terminal 13ª, coil $c$, coil $c'$, terminal 13ᵇ, conductor 21, brush terminal 13, brush $b'$, the commutator and the armature coils, brush $b$, brush terminal 13' and conductor 26 back to the source 22, and in the reverse direction through the same circuit back to the source 22. Of course both of the coils $c$ and $c'$ will in this instance be energized by the alternating current flowing through the path just described. Owing to the fact that the polarity of the opposite poles of the electro magnet is determined and controlled by the direction of flow of the current through the coils $c$ and $c'$ the rapid alternation in the direction of the current flow through the armature circuit simultaneously reverses the polarity of the magnet, as the coils $c$ and $c'$ are included within the armature circuit. The synchronization of the reversal of direction of flow of the current and the reversal of polarity of the magnet is in consequence necessarily absolute, and a constant attraction and continuous rotation of the armature in one direction is thus maintained.

When a battery, such as 27, is employed as a source of energy, the connections shown are such that current will flow from the battery through conductor 27' to the brush terminal 13', and through brush $b$, the commutator and the armature coils, to brush $b'$, the return path being by way of conductor 21, to terminal 13ᵇ, conductor 20, switch 18, and conductor 28. In this case the coils $c$ and $c'$ are not included within the circuit and are not energized and the field excitation is that of the permanent magnet alone.

A high voltage direct current may also be connected with my improved machine, as shown in Fig. 4, in such a manner that this current may also flow through the coils $c$ and $c'$. This source of direct current is illustrated at 30. Its circuit is shown as controlled by the same switch 23 that controls the circuit of the alternating current generator 22. The circuit of the direct current generator 30 is as follows: from the source 30, through switch 23, lamp 23ª to conductor 25, terminal 13ª, coils $c$ and $c'$, terminal 13ᵇ, conductor 21, brush terminal 13, brush $b'$ the commutator and the armature coils, brush $b$, brush terminal 13', and conductors 26 and 31 back to said source.

Fig. 4 is intended merely to illustrate the various ways in which my machine may be used with current of different kinds and from various sources, the addition of the terminals 13ª and 13ᵇ permitting the machine shown in Fig. 4 to be used either with or without the coils $c$ and $c'$ in circuit and with either battery, direct or alternating current.

It will, of course, be obvious that when the legs of the laminated field are wound with coils, for the purpose of magnetizing the field by passing an electric current through such coils, any suitable circuit connection of these coils may be made. Here said coils are illustrated as in series with each other and with the armature.

What I claim and desire to secure by Letters Patent is:

1. A motor comprising in combination, an armature having a commuted winding, a core of magnetic material of high retentiveness, a magnetizing winding for said core, means for connecting said magnetizing winding in series with said armature winding, and terminals connected with said armature and magnetizing windings whereby an electromotive force may be impressed on either winding alone or on both armature and magnetizing windings in series.

2. A motor comprising in combination, an armature having a commuted winding, a laminated core of magnetic material of high retentiveness, a magnetizing winding for said core, means for connecting said magnetizing winding in series with said armature winding and terminals connected to said armature and magnetizing windings, whereby an electromotive force may be impressed on either winding alone or on both armature and magnetizing winding in series.

In testimony whereof I have hereunto set my hand in presence of two subscribing witnesses, this fourth day of May, 1915.

CHRISTOPHER A. SHEA.

Witnesses:
CARROLL L. PERKINS,
K. M. SULLIVAN.